UNITED STATES PATENT OFFICE.

BLAKE E. GAMBLE, OF BOWMANSDALE, PENNSYLVANIA.

BRIQUET AND PROCESS OF MAKING THE SAME.

13,590. Specification of Reissued Letters Patent. Reissued July 8, 1913.

No Drawing. Original No. 1,047,198, dated December 17, 1912, Serial No. 716,550. Application for reissue filed June 11, 1913. Serial No. 772,961.

*To all whom it may concern:*

Be it known that I, BLAKE E. GAMBLE, a citizen of the United States, residing at Bowmansdale, in the county of Cumberland and State of Pennsylvania, have invented a new and useful Briquet and Process of Making the Same, of which the following is a specification.

The present invention relates to a briquet and process of making the same.

The invention will be described in connection with the briqueting of comminuted carbonaceous material, although, as is well understood in this art, it is equally well adapted for the briqueting of iron and other ores, and other equivalent materials.

One object of the invention is the production of a hard and solid water-proof artificial fuel, in which the predominating ingredient is a comminuted carbonaceous material of a character depending upon the locality of its origin, there being a combustible coking and adhesive binder individually coating each granule, while surrounding each coated granule is an augmenting binder composed of an impervious adhesive, which also displaces any deficiency of volatile gases in the carbonaceous material, the augmenting binder being held against running during burning by the first binder, and producing in the finished briquet an impervious briqueted fuel. To this end, the following materials are used, that is comminuted coal, either anthracite, bituminous, semi-anthracite, semi-bituminous, and culms of any and all combinations of the above, peat, lignite, or in fact any combination of these carbonaceous materials.

It has been found that a slight amount of moisture should be retained in the carbonaceous material, such amount being slightly above the normal moisture retained under atmospheric conditions, the same assisting in the cohesion thereto of the first or coking binder, which is preferably sulfite liquor neutralized by an alkali, such alkali being preferably caustic soda. This neutralized liquor is precipitated in any well known process. This binder is thoroughly mixed with the carbonaceous material to individually coat the granules thereof, and after such coating, the mass is placed in a superheater with the augmenting binder, such as a mineral pitch, preferably a coal tar pitch, asphaltum, or in fact any product having the necessary qualities and readily accessible to the locality in which the fuel is made.

During the heating and coating of the already coated granules, moisture in the form of vapor, steam or sprayed water is supplied, and this moisture is to prevent brittleness in the augmenting binder, so that when the final mass is briqueted, a compact hard homogeneous, not too brittle, and yet impervious fuel is the result.

The preferred amount of the various materials used will vary according to the carbonaceous material, anthracite coal requiring less moisture and a lesser quantity of the binder and augmenting binder, while peat, or lignite and any combination, being a greater absorbent of moisture than anthracite coal will require a greater amount. These proportions have been found to vary as follows:—carbonaceous material, 83 to 99 per cent.; primary binder, ½ to 7 per cent.; and augmenting binder, ½ to 10 per cent.

The process of forming the briquet is as follows:—The carbonaceous material is reduced or comminuted to the preferred granule, and according to the amount of moisture desired retained, the same is dried. After the necessary desiccation, the first binder is thoroughly mixed to provide a coating around each individual granule of the carbonaceous material, the slight or necessary amount of moisture retained in the material, assisting in the cohesion of the binder. The thus coated granules are now subjected to heat and during such subjection, the second or augmenting binder is thoroughly mixed or commingled with the already coated granules, this augmenting binder forming a second coating about the granules. While the materials are being heated, moisture is supplied by foaming with the mass, or spraying vapor, steam or water, this moisture preventing brittleness in the augmenting binder and assisting the same in providing a slightly pliable impervious binder for the fuel. This double coated granuled mass is now subjected to pressure in a briqueting machine and formed into briquets.

The mineral pitch, or augmenting binder acts as a medium to prevent exterior moisture affecting the fuel that tends to cause disintegration, and also being a combustible material supplies any of the deficiencies of volatile matters lost from the carbonaceous material which often being left in the open slakes and from the other causes loses its natural volatile and combustible gases.

As before stated, the first binder is preferably sulfite liquor neutralized by an alkali, and formed into what is known as sulfite pitch. The augmenting binder employed is preferably a mineral pitch, or any one of the following, either singly or combinedly, such for instance as coal tar pitch, common asphaltum pitch, coal and gas tar pitches, and other pitches of a mineral nature.

The heat required has been found to range from 50 to 700 degrees Fahr., depending upon the melting point of the pitch employed.

Regarding the amount of pressure necessary to produce the briqueted fuel, it has been found that according to the nature of the carbonaceous material, such pressure will vary from 1,000 to 26,000 pounds to the square inch, the softer more absorbent material requiring the greatest to produce a dense mass.

The herein described process can be employed in the artificial agglomerating of pulverized minerals and ores of all kinds, such as iron and other ores, as well as fuels.

What is claimed, is:—

1. An artificial agglomerate, composed of comminuted and desiccated mineral material; an inner coating for the granules thereof composed of a tough elastic and adhesive binder; and an outer coating for the granules of an impervious combustible augmenting binder material, the first binder under burning conditions holding the augmenting binder against running.

2. An artificial fuel, composed of comminuted and desiccated carbonaceous material; an inner coating for the granules thereof composed of a tough elastic and adhesive binder; and an outer coating for the granules of an impervious combustible augmenting binder material, the first binder under burning conditions holding the augmenting binder against running.

3. An artificial fuel, composed of comminuted and desiccated carbonaceous material; an inner coating for the granules thereof composed of a coking adhesive binder; and an outer coating for the granules of an impervious combustible material forming an augmenting binder and replacing the deficiencies of volatile matter in the carbonaceous material to assist combustion.

4. An artificial fuel, composed of comminuted and desiccated carbonaceous material; an agglutinative impervious and volatile gas supplying binder; and a combustible and coking binder, the latter holding the former binder against running during the burning of the fuel.

5. An artificial fuel, composed of comminuted and desiccated carbonaceous material; an adhesive binder coating individually the granules thereof; and a mineral pitch forming an outer coating for the granules, the first binder assisting in the coking of the fuel and preventing the running of the pitch during the burning of the fuel.

6. The herein described process of briqueting, consisting in mixing with comminuted and properly desiccated material a combustible binder to individually coat the granules of the material; heating and during the heating of the mass commingling therewith an impervious adhesive augmenting binder to form a protecting coating for the first coating; and then subjecting the granules to pressure to form briquets.

7. The herein described process of making artificial fuel, consisting in mixing with comminuted and properly desiccated carbonaceous material, a combustible and coking binder to individually coat the granules of the carbonaceous material; heating and during heating of the mass commingling therewith an impervious adhesive augmenting binder to form a protecting coating for the first coating; and then subjecting the granules to pressure to form briquets.

8. The herein described process of making artificial fuel, consisting in mixing with comminuted and properly desiccated carbonaceous material, an adhesive of a combustible and coking nature to form a binder and a primary coating for the granules of carbonaceous material; heating and moistening the coated granules and simultaneously mixing therewith an augmenting binder of an impervious, combustible and adhesive nature; and then subjecting the granules to pressure to form briquets.

9. The herein described process of making artificial fuel, consisting in mixing with comminuted carbonaceous material a neutralized sulfite liquor to form a primary and coking binder; heating the same and simultaneously mixing with the mass an impervious combustible adhesive binder which protects the primary binder from the exterior air and is itself protected against running by the primary binder during the burning of the fuel; and then subjecting the materials to pressure to form briquets.

10. A step in the art of briqueting, consisting in coating the individual granules of comminuted material with a combustible adhesive, and individually coating such coated granules with an impervious combustible augmenting binder.

11. A step in the art of briqueting fuel, consisting in coating the individual granules of comminuted carbonaceous material with a combustible coking adhesive, and individually coating such coated granules with an impervious combustible augmenting binder and volatile gas applying agent.

In testimony that I claim the foregoing as my own, I have hereto affixed my signature in the presence of two witnesses.

BLAKE E. GAMBLE.

Witnesses:
SELINA WILLSON,
W. H. C. CLARKE.

Copies of this patent may be obtained for five cents each, by addressing the "Commissioner of Patents, Washington, D. C."